United States Patent
Liang et al.

(10) Patent No.: US 6,795,229 B2
(45) Date of Patent: Sep. 21, 2004

(54) ELECTROPHORETIC DISPLAY WITH SUB RELIEF STRUCTURE FOR HIGH CONTRAST RATIO AND IMPROVED SHEAR AND/OR COMPRESSION RESISTANCE

(75) Inventors: Rong-Chang Liang, Cupertino, CA (US); Abbas Hosseini, Mountain View, CA (US); Hsiao-Ken Chuang, Arcadia, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 0 days.

(21) Appl. No.: 10/229,530

(22) Filed: Aug. 27, 2002

(65) Prior Publication Data

US 2003/0043450 A1 Mar. 6, 2003

Related U.S. Application Data

(60) Provisional application No. 60/315,647, filed on Aug. 28, 2001.

(51) Int. Cl.[7] .......................... G02B 26/00; G02F 1/03; G02F 1/29; G09G 3/34; G09G 17/04; H01B 3/20
(52) U.S. Cl. ................. 359/296; 359/254; 359/316; 345/107; 430/35; 252/572
(58) Field of Search ................. 359/296, 254, 359/316; 345/107, 108, 111; 430/35; 252/572

(56) References Cited

U.S. PATENT DOCUMENTS

| | | |
|---|---|---|
| 3,229,607 A | 1/1966 | Battaglia |
| 3,612,758 A | 10/1971 | Evans et al. ............. 348/803 |
| 3,668,106 A | 6/1972 | Ota ......................... 358/305 |
| 3,689,346 A | 9/1972 | Rowland |
| 3,697,679 A | 10/1972 | Hathaway ................. 360/85 |
| 3,870,517 A | 3/1975 | Ota et al. |
| 3,885,964 A | 5/1975 | Nacci |
| 3,892,568 A | 7/1975 | Ota et al. |
| 3,908,052 A | 9/1975 | Sanders |

(List continued on next page.)

FOREIGN PATENT DOCUMENTS

| | | |
|---|---|---|
| CA | 2340683 | 2/2001 |
| DE | 199 27 359.6 | 12/2000 |
| EP | 0990942 | 4/2000 |

(List continued on next page.)

OTHER PUBLICATIONS

U.S. patent application Ser. No. 09/879,408, Chen et al., filed Jun. 2001.

(List continued on next page.)

Primary Examiner—Georgia Epps
Assistant Examiner—Jack Dinh
(74) Attorney, Agent, or Firm—Howrey, Simon, Arnold & White LLP

(57) ABSTRACT

This invention relates to an electrophoretic display comprising isolated cells of well-defined shape, size and aspect ratio which cells have internal sub relief structures and are filled with charged pigment particles dispersed in a dielectric solvent. The display shows an improved contrast ratio and resistance against shear and compression pressures. The display may have the traditional up/down switching mode, an in-plane switching mode or a dual switching mode.

40 Claims, 6 Drawing Sheets

U.S. PATENT DOCUMENTS

| | | |
|---|---|---|
| 3,928,671 A | 12/1975 | Robusto et al. |
| 4,071,430 A | 1/1978 | Liebert ................... 359/241 |
| 4,093,534 A | 6/1978 | Carter et al. ............. 359/296 |
| 4,190,352 A | 2/1980 | Bruning |
| 4,285,801 A | 8/1981 | Chiang .................... 252/570 |
| 4,655,897 A | 4/1987 | DiSanto et al. |
| 4,680,103 A | 7/1987 | Beilin Solomon I. et al. ...... 359/296 |
| 4,741,604 A | 5/1988 | Kornfeld |
| 4,741,988 A | 5/1988 | Van der Zande et al. ... 430/312 |
| 4,891,245 A | 1/1990 | Micale |
| 4,924,257 A | 5/1990 | Jain |
| 4,995,718 A | 2/1991 | Jachimowicz et al. ........ 353/31 |
| 5,132,820 A | 7/1992 | Someya et al. |
| 5,177,476 A | 1/1993 | DiSanto et al. |
| 5,200,120 A | 4/1993 | Sakai |
| 5,274,481 A | 12/1993 | Kim |
| 5,276,438 A | 1/1994 | DiSanto et al. ............ 345/107 |
| 5,279,511 A | 1/1994 | DiSanto et al. ............. 445/24 |
| 5,285,236 A | 2/1994 | Jain |
| 5,380,362 A | 1/1995 | Schubert ................... 106/493 |
| 5,398,041 A | 3/1995 | Hyatt |
| 5,403,518 A | 4/1995 | Schubert ................... 252/572 |
| 5,432,526 A | 7/1995 | Hyatt |
| 5,450,220 A | 9/1995 | Onishi et al. |
| 5,460,688 A | 10/1995 | Disanto et al. |
| 5,573,711 A | 11/1996 | Hou et al. ................. 252/572 |
| 5,589,100 A | 12/1996 | Grasso et al. .......... 252/299.01 |
| 5,652,645 A | 7/1997 | Jain |
| 5,699,097 A | 12/1997 | Takayama et al. .......... 347/171 |
| 5,731,860 A | 3/1998 | Harada et al. |
| 5,739,889 A | 4/1998 | Yamada et al. |
| 5,835,174 A | 11/1998 | Clikeman et al. ............ 349/86 |
| 5,843,333 A | 12/1998 | Hakemi |
| 5,872,552 A | 2/1999 | Gordon, II et al. ........ 345/107 |
| 5,877,848 A | 3/1999 | Gillette et al. |
| 5,895,541 A | 4/1999 | Kobayashi et al. |
| 5,914,806 A | 6/1999 | Gordon II et al. ......... 359/296 |
| 5,930,026 A | 7/1999 | Jacobson et al. .......... 359/296 |
| 5,942,154 A | 8/1999 | Kim et al. |
| 5,956,112 A | 9/1999 | Fujimori et al. |
| 5,961,804 A | 10/1999 | Jacobson et al. .......... 204/606 |
| 5,976,405 A | 11/1999 | Clikeman et al. |
| 5,985,084 A | 11/1999 | Summersgill et al. |
| 5,995,190 A | 11/1999 | Nagae et al. |
| 6,017,584 A | 1/2000 | Albert et al. ........... 427/213.3 |
| 6,018,383 A | 1/2000 | Dunn et al. |
| 6,037,058 A | 3/2000 | Clikeman et al. ........ 428/402.2 |
| 6,064,508 A | 5/2000 | Forgette et al. |
| 6,067,185 A | 5/2000 | Albert et al. ............... 359/296 |
| 6,111,598 A | 8/2000 | Faris .......................... 348/57 |
| 6,113,810 A | 9/2000 | Hou et al. ................. 252/572 |
| 6,113,836 A | 9/2000 | Sakai et al. |
| 6,120,588 A | 9/2000 | Jacobson ................ 106/31.16 |
| 6,120,839 A | 9/2000 | Comiskey ............... 427/213.3 |
| 6,120,946 A | 9/2000 | Johnson et al. |
| 6,166,797 A | 12/2000 | Bruzzone et al. |
| 6,172,798 B1 | 1/2001 | Albert et al. ............... 359/296 |
| 6,184,856 B1 | 2/2001 | Gordon, II et al. ......... 345/107 |
| 6,191,250 B1 | 2/2001 | Aida et al. |
| 6,239,896 B1 | 5/2001 | Ikeda |
| 6,252,624 B1 | 6/2001 | Yuasa et al. ................. 348/56 |
| 6,312,304 B1 | 11/2001 | Duthaler et al. ............. 445/24 |
| 6,327,072 B1 | 12/2001 | Comiskey et al. .......... 359/296 |
| 6,337,761 B1 | 1/2002 | Rogers et al. ............. 359/296 |
| 6,392,785 B1 | 5/2002 | Albert et al. |
| 6,392,786 B1 | 5/2002 | Albert ....................... 359/296 |
| 6,400,430 B2 | 6/2002 | Nakao et al. |
| 6,400,492 B1 | 6/2002 | Morita et al. |
| 6,512,626 B1 | 1/2003 | Schmidt |
| 6,514,328 B1 | 2/2003 | Katoh et al. |
| 6,525,865 B2 | 2/2003 | Katase |
| 2001/0007352 A1 | 7/2001 | Moore ........................ 313/582 |
| 2001/0009352 A1 | 7/2001 | Moore ........................ 313/582 |
| 2002/0018043 A1 | 2/2002 | Nakanishi |
| 2002/0029969 A1 | 3/2002 | Yager et al. |
| 2002/0126249 A1 | 9/2002 | Liang et al. ................ 349/187 |
| 2002/0182544 A1 | 12/2002 | Chan-Park et al. ......... 430/311 |
| 2002/0188053 A1 | 12/2002 | Zang et al. ................. 524/474 |
| 2002/0196525 A1 | 12/2002 | Chen et al. ................. 359/296 |

FOREIGN PATENT DOCUMENTS

| | | | |
|---|---|---|---|
| EP | 1065553 | 1/2001 | |
| EP | 1089118 A2 | 4/2001 | .......... G02F/1/167 |
| EP | 1 089 118 A2 | 4/2001 | .......... G02F/1/167 |
| EP | 1195603 | 4/2002 | |
| JP | 57104116 | 6/1982 | |
| JP | 59-171930 | 9/1984 | ............. G02F/1/19 |
| JP | 60-205452 | 10/1985 | |
| JP | 64-86116 | 3/1989 | |
| JP | 01-267525 | 10/1989 | |
| JP | 02223934 | 9/1990 | |
| JP | 02284125 | 11/1990 | |
| JP | 02284126 | 11/1990 | |
| JP | 6242423 | 9/1994 | |
| JP | 2000 035677 | 2/2000 | |
| JP | 2000 075497 | 3/2000 | |
| JP | 2001 042118 | 2/2001 | |
| JP | 2001 056653 | 2/2001 | |
| WO | WO 97/04398 | 2/1997 | |
| WO | WO 98/57226 | 12/1998 | |
| WO | WO 99/08151 | 2/1999 | |
| WO | WO 99/10768 | 3/1999 | |
| WO | WO 99/53373 | 10/1999 | |
| WO | WO 99/56171 | 11/1999 | .......... G02F/1/167 |
| WO | WO 00/03291 | 1/2000 | |
| WO | WO 00/36649 | 6/2000 | |
| WO | WO 00/60410 | 10/2000 | .......... G02F/1/167 |
| WO | WO 00/77571 | 12/2000 | |
| WO | WO 01/67170 | 9/2001 | .......... G02F/1/167 |
| WO | WO 02/01281 | 1/2002 | |

OTHER PUBLICATIONS

Bryning, et al., "37.4: Reverse–Emulsion Electrophoretic Display (REED)" *SID 98 Digest* pp. 1018–1021 (1998).

Comiskey, B., et al., "7.4L: Late–News Papers: Electrophoretic Ink: A Printable Display Material", 1997 SID International Symposium Digest of Technical Papers, Boston, May 13–15, 1997, vol. 28, pp75–76.

Inoue, S. et al., "High Resolution Microencapsulated Electrophoretic Display (EPD) Driven by Poly–Si TFTs With Four–Level Grayscale" *IEEE Transactions on Electron Devices* 49(8), pp–1532–1539 (2002).

Kazlas, P. et al., "12.1: 12.1 SVGA Microencapsulated Electrophoretic Active Matrix Display for Information Appliances" *SID 01 Digest* 152–155 (2001).

Kishi, E et al, "5.1 Development of In–Plane EPD", Canon Research Center, SID 00 Digest, pp–24–27 (2002).

J. C. Lewis, "Electrophoretic Displays", Allen Clark Research Centre, The Plessey Company Ltd., Caswell, Towcester, Northants, England, pp–223–240 (N/A) date.

Matsuda, Y. "Newly designed, high resolution, active matrix addressing in plane EPD" *IDW02 EP2–3* 1341–1344 (2002).

Ota, et al., "Developments in Electrophoretics Displays" *Proc. of SID*, vol. 18/3&4, pp–243–254 (1977).

Swanson, et al., "5.2 High Performance Electrophoretic Displays" *SID 00 Digest*, pp–29–31 (2000).

USSN 09/518,488, filed Mar. 3, 2000 (to be provided upon request).
USSN 09/606,654, filed Jun. 28, 2000 (to be provided upon request).
USSN 60/306,312, filed Jul. 17, 2001 (to be provided upon request).
USSN 60/308,437, filed Jul. 27, 2001 (to be provided upon request).
Cominsky, B. et al., "An Electrophoretic Ink For All–Printed Reflective Electronic Displays", Letters to Nature, pp. 253–255 (1998).
Dalisa, A.L., "Electrophoretic Display Technology", IEEE Transactions of Electron Devices, Jul. 1997, pp. 827–834.
Drzaic, P., "Liquid Crystal Dispersion", The PDLC Paradigm, (1995), pp. 1–9.
Harvey, T.G. "Replication Techniques For Micro–Optics", SPIE, vol. 3099, pp. 76–82 (1997).
Hopper, M.A. and Novotny, V., "An Electrophoretic Display, It's Properties, Model, and Addressing" IEEE Transactions on Electron Devices, vol. ED–26, No. 8, Aug. 1979, pp. 1148–1152.

Harbour, J.R. et al., "Subdivided Electrophoretic Display", Xerox Disclosure Journal, vol. 4, No. 6 (1979).
Lewis, J.C., et al., "Gravitational, Inter–Particle–Electrode Forces in Electrophoretic Display", Proceedings of the S.I.D., vol. 18/3&4 (1977).
Murau, P., et al., "The Understanding and Elimination of Some Suspension Instabilites in an Electrophoretic Display", J. Appl. Phys., 49(9), (1978).
Nakamura, E., et al., "Development of Electrophoretic Display Using Microcapsulated Suspension", SID Digest, (1998), pp. 1014–1017.
Ota, I., et al., "Electrophoretic Image Display EPID Panel", Proceedings of the IEEE, vol. 1, No. 7, Jul. 1973.
Singer, B. and Dalisa, A.L., "An X–Y Addressable Electrophoretic Display", Proceeding of the S.I.D., vol. 18/3&4, (1977).
Slafer, D.W., et al., "Continuous Manufacturing of Thin Cover Sheet Optical Media", SPIE, vol. 1663, (1992), pp. 323–335.

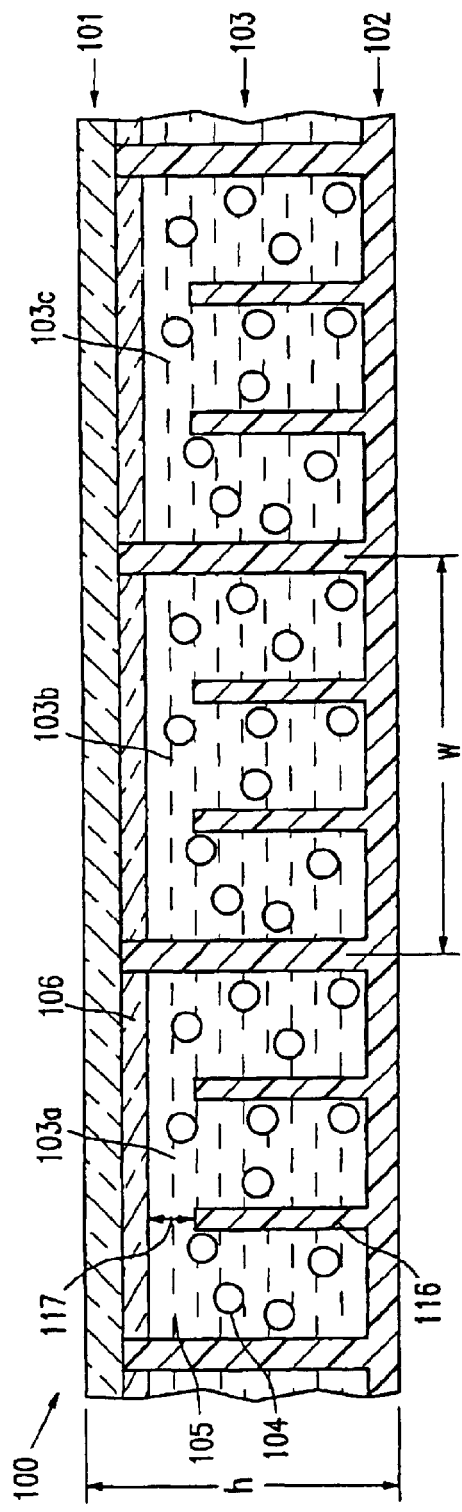
FIG. 1
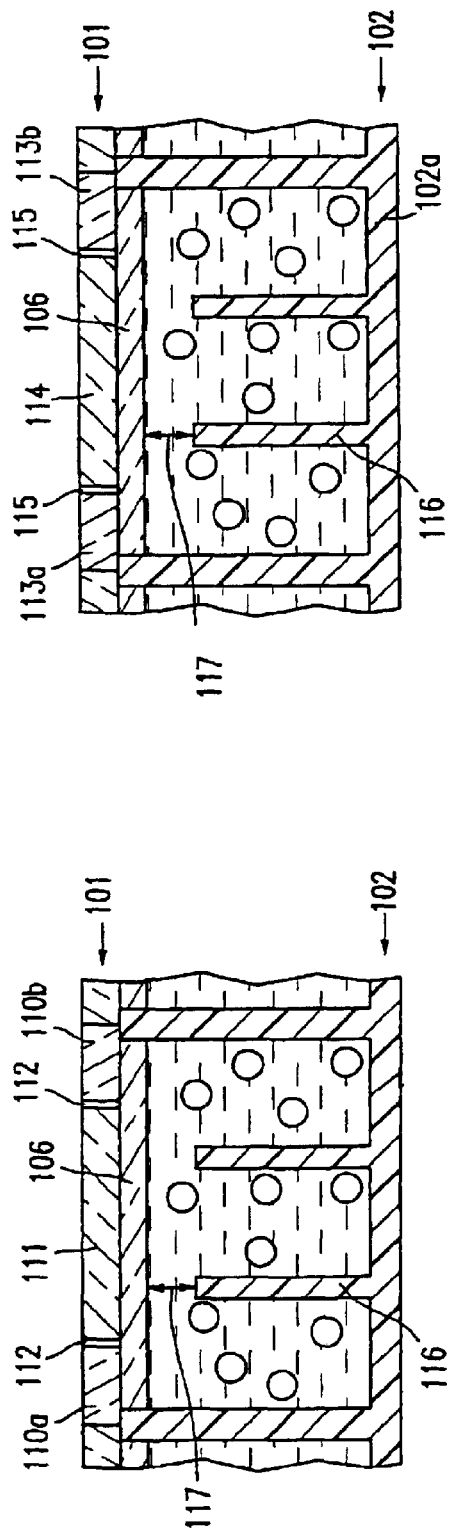
FIG. 1A
FIG. 1b

WHITE STATE

BLACK STATE

COLOR (RED) STATE

ELECTROPHORETIC DISPLAY WITH SUB RELIEF STRUCTURE FOR HIGH CONTRAST RATIO AND IMPROVED SHEAR AND/OR COMPRESSION RESISTANCE

This application claims the benefit of Provisional application No. 60/315,647 filed Aug. 28, 2001.

BACKGROUND OF THE INVENTION a) Field of the Invention

This invention relates to an improved electrophoretic display comprising isolated cells of well-defined shape, size and aspect ratio, and the cells have internal sub relief structures and are filled with charged particles dispersed in a dielectric solvent.

The display may have the traditional up/down switching mode, the in-plane switching mode or the dual switching mode.

b) Description of Related Art

The electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages.

EPDs of different pixel or cell structures have been reported in prior art, for example, the partition-type EPD (M. A. Hopper and V. Novotny, *IEEE Trans. Electr. Dev.*, 26(8):1148–1152 (1979)) and the microencapsulated EPD (U.S. Pat. Nos. 5,961,804 and 5,930,026). However, each of these has its own problems as noted below.

In a partition-type EPD, there are partitions between the two electrodes for dividing the space into smaller cells in order to prevent undesired movements of the particles such as sedimentation. However, difficulties are encountered in many aspects including the formation of the partitions, the process of filling the display with the fluid, enclosing the fluid in the display and keeping the suspensions of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution and, to achieve a useful contrast ratio, their mean particle size is relatively large (50–150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge controlling agent is often needed in this type of EPDs. However, the microencapsulation process in an aqueous solution imposes a limitation on the type of charge controlling agents that can be used. Other drawbacks associated with the microcapsule system include poor resolution and poor addressability for color applications.

An improved EPD technology was recently disclosed in co-pending applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO2/01280) and U.S. Ser. No. 09/784,972, filed on Feb. 15, 2001, all of which are incorporated herein by reference. The improved EPD comprises closed cells formed from microcups of well-defined shape, size and aspect ratio and filled with charged pigment particles dispersed in a dielectric solvent. The electrophoretic fluid is isolated and sealed in each cell.

The microcup structure enables a format flexible, efficient roll-to-roll continuous manufacturing process for the preparation of EPDs. The displays can be prepared on a continuous web of a conductor film such as ITO/PET by, for example, (1) coating a radiation curable composition onto the ITO/PET film, (2) making the microcup structure by a microembossing or photolithographic method, (3) filling the microcups with an electrophoretic fluid and sealing the microcups, (4) laminating the sealed microcups with another conductor film, and (5) slicing and cutting the display to a desirable size or format for assembling.

One advantage of this EPD design is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired size and format. The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation.

In order to achieve a higher contrast ratio, cells formed from wider microcups and having narrower partition walls are preferred since they allow a higher cell opening area ratio (i.e., the cell opening area to the total area) and as a result, less light leaking out through the inactive walls. Although the resolution of the display may decrease as the cell opening ratio increases, using a wider cell (up to about 300 microns) is still one of the most cost effective ways to achieve a high contrast ratio particularly for low resolution and monochrome applications. However, as the opening area ratio increases, the resistance against compression and/or shear forces imposed by, for example, a sharp stylus for a touch screen panel also decreases significantly. Also, as the opening ratio increases, undesirable particle movement such as convection flow inside the cells becomes more significant and the display contrast ratio in fact decreases. The image uniformity of the display also deteriorates if excessive undesirable movement is present.

SUMMARY OF THE INVENTION

The present invention is directed to an improved EPD employing the microcup technology. The display comprises isolated cells prepared from the microcups of well-defined shape, size and aspect ratio. The cells have internal sub relief structures and are filled with charged pigment particles dispersed in a dielectric solvent The display may have the traditional up/down switching mode, the in-plane switching mode or the dual switching mode. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between a top electrode plate and a bottom insulator layer. Within the cells, there are sub relief structures rising from the bottom layer. They may be discrete structures such as columns, cylinders, wedges, crosses or continuous structures such as walls and grids. The sub structures, however, do not touch the top transparent layer. In other words, there are gaps between the top of the structures and the top transparent layer. The distance between the top of the sub relief structures and the top transparent viewing layer is typically about 3 to 50 microns, preferably about 5 to 30 microns, and most preferably about 10 to 20 microns. The top surface of the continuous sub structures may be of any shape and is preferred to be flat and no larger than the bottom of the structures. The cross-section of the sub relief structures can be of any shapes, including round, square, rectangle, oval and others.

BRIEF DESCRIPTION OF THE DRAWINGS

FIG. 1 is a scheme depiction of the electrophoretic cells of the present invention.

FIG. 1*a* is the electrophoretic display having the in-plane switching mode.

FIG. 1*b* is the electrophoretic display having the dual switching mode.

Figure 2:
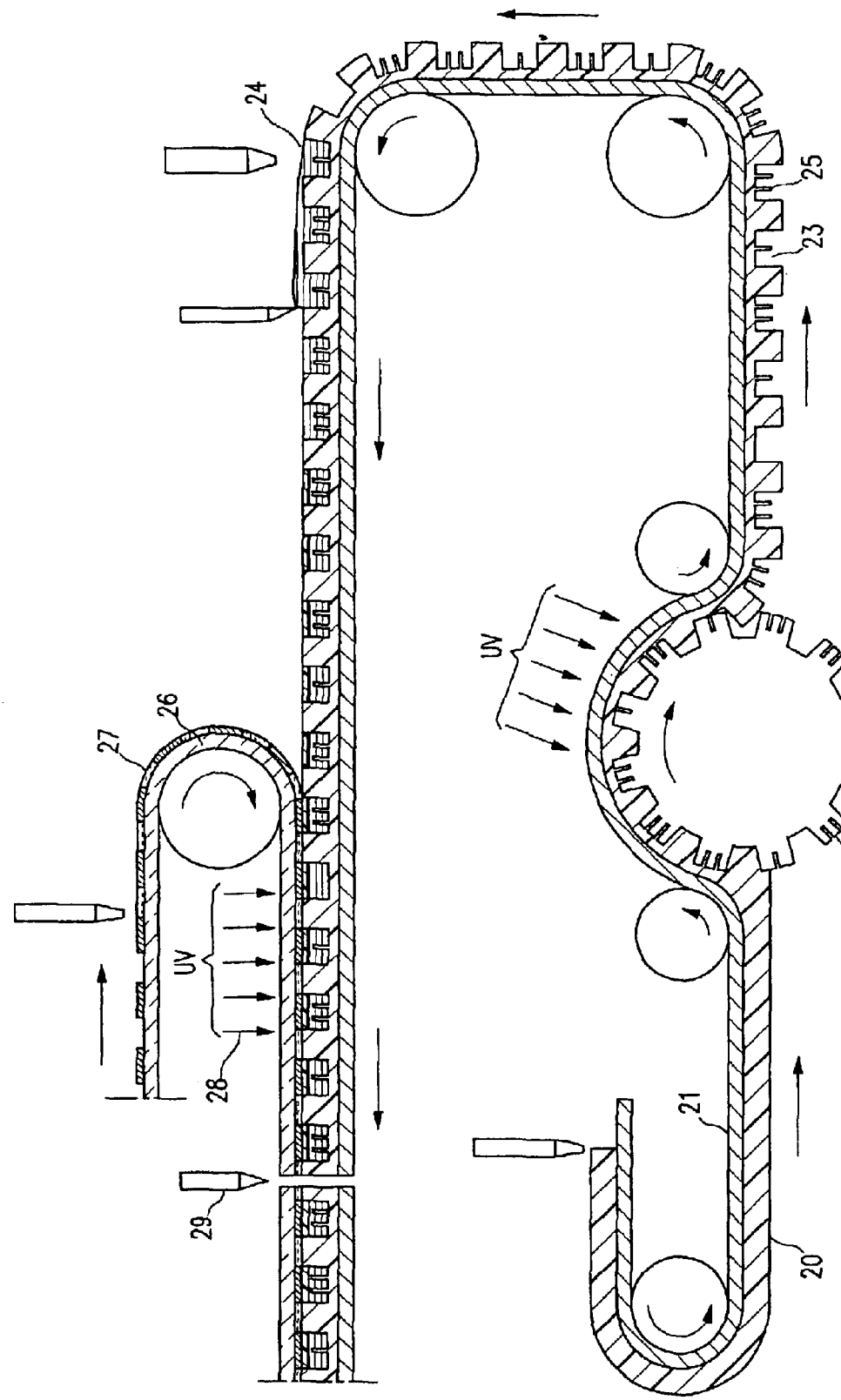
FIG. 2 is a flow chart for manufacturing a black/white electrophoretic display or other monochrome electrophoretic displays.
Figure 3A:
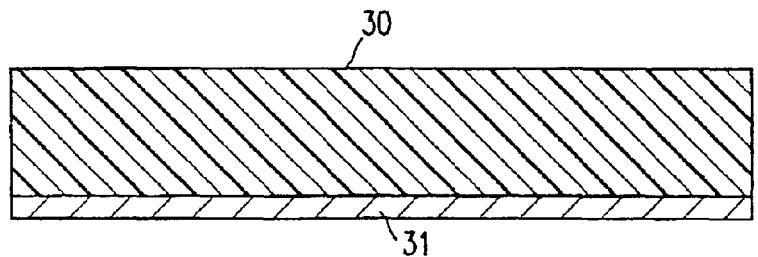
FIGS. 3*a*–3*h* are a flow chart for manufacturing a full color electrophoretic display.
Figure 3B:
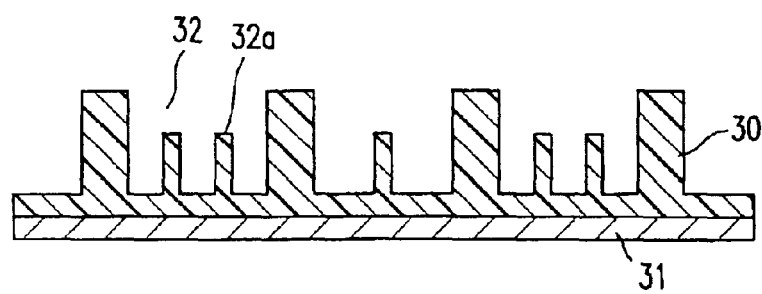
Figure 3C:
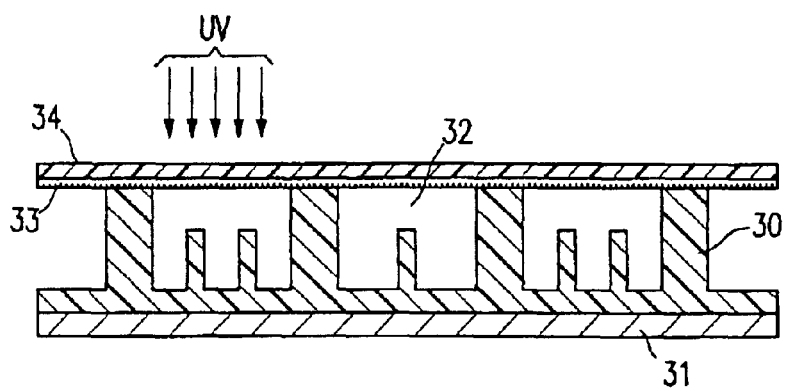
Figure 3D:
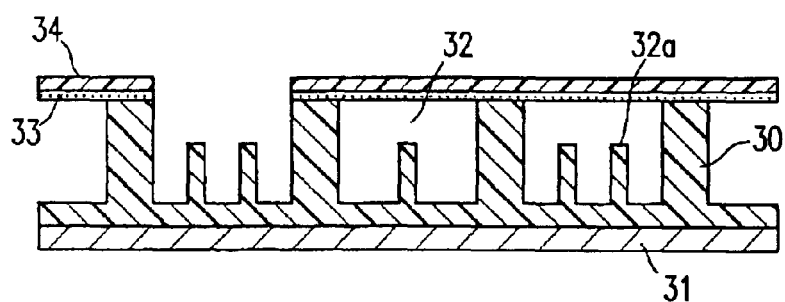
Figure 3E:
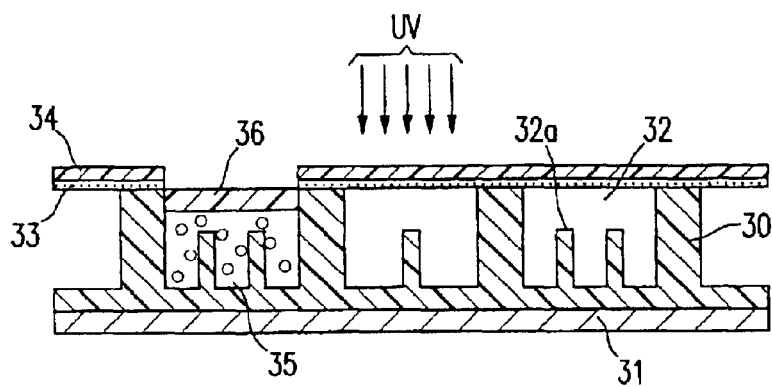
Figure 3F:
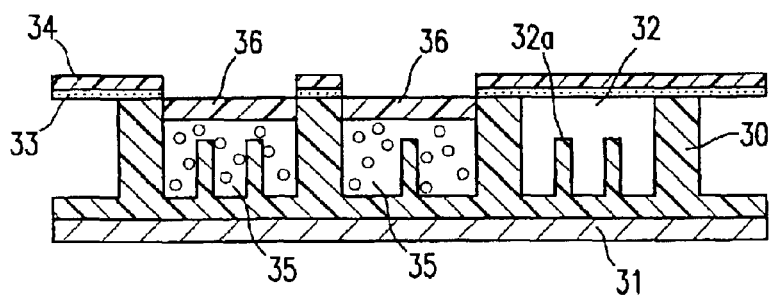
Figure 3G:
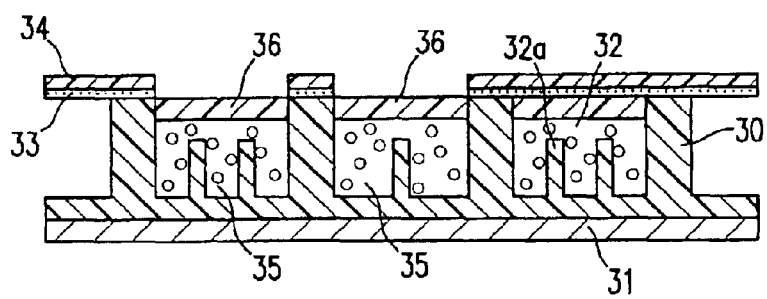
Figure 3H:
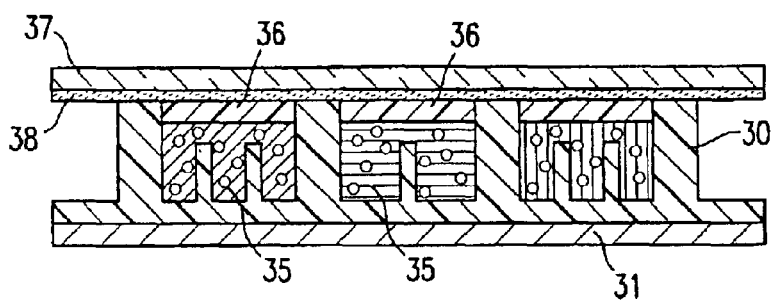

It is noted that the drawings are not to scale.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are predetermined according to the specific parameters of the manufacturing process.

The term "aspect ratio" is a commonly known term in the art of electrophoretic displays. In this application, it refers to the depth to width or depth to length ratio of the microcups.

The term "isolated" refers to the electrophoretic cells which are individually sealed with a sealing layer so that the electrophoretic composition enclosed within one cell cannot be transferred to other cells.

Preferred Embodiments

An electrophoretic display (100) of the present invention, as shown in FIG. 1, comprises a top transparent layer (101), one bottom layer (102) and a layer of isolated cells (103) enclosed between the two layers. The top transparent layer (101) is a transparent conductor film such as ITO on PET. The cells (103*a*, 103*b* and 103*c*) are filled with charged particles (104) dispersed in a dielectric solvent (105) and sealed with a sealing layer (106). The top transparent layer is usually laminated over the sealed cells with an adhesive layer.

In the display having an in-plane switching mode (FIG. 1*a*), the bottom layer (102) is an insulator substrate and the top electrode plate (101) comprises in-plane electrodes (110*a* and 110*b*) and a top electrode (111) between the two in-plane electrodes separated by gaps (112). Alternatively, the top layer may have only one in-plane switching electrode and one top electrode with a gap in between. In the display having a dual switching mode (FIG. 1*b*), the bottom layer (102) comprises a column electrode (102*a*). The top layer (101) contains an in-plane electrode (113*a*) on the left-hand side, a top electrode (114) and another in-plane electrode (113*b*) on the right-hand side. There are gaps (115) separating the in-plane and top electrodes. Alternatively, the top electrode plate may have only one in-plane electrode and one top electrode with a gap in between (not shown).

The cells have internal sub relief structures (116). The sub structures may be of any shapes rising from the bottom layer. They may be discrete structures such as columns, cylinders, wedges, crosses or continuous structures such as walls and grids. The sub structures, however, do not touch the top transparent layer. In other words, there are gaps (117) between the top of the sub structures and the top transparent layer. The gap is typically about 3 to 50 microns, preferably between about 5 to 30 microns, and most preferably about 10 to 20 microns. For discrete structures, the cross-section of the structures may be of any shapes, including round, square, rectangle, oval and others. The diameter or the width of the discrete sub structures is typically from 3 to 50 microns, preferably from 5 to 30 microns, more preferably from 8 to 20 microns. For continuous sub structures, the top surface of the structures may be of any shapes and is preferred to be flat and no larger than the bottom of the structures. The length of the continuous sub structures may be the same as that of the cell walls.

It is preferred to have an average of at least one sub relief structure per cell although some of the cells may have no sub structure. Depending on the height (h) and the width (w) of the cells (103), the optimum number of the sub structures for the best contrast ratio and resistance to shear and compression pressure may be varied. The shortest distance between the sub structures and any of the cell walls may also vary. It may be more than three times of the cell height. However, it is preferred that the distance is less than three times of the cell height (h), preferably less than two times of the cell height.

The displays of the present invention show considerably better resistance to screen panel. The sub relief structures effectively limit the degree of deformation or indentation that may be caused by the stylus and greatly reduce the probability of damaging the brittle top electrode layer, such as an ITO conductor film of the display made of wide microcups.

The presence of the sub structures also significantly reduces undesirable particle movement such as convective flow inside the cells. Moreover, the gaps (117) between the top of the sub relief structures and the top transparent layer allow the electrophoretic fluid to cover the structures and significantly reduce the loss of contrast ratio by reducing the light leakage due to the presence of the structures. As a result, the contrast ratio of the display of the present invention with sub structures within the cells is significantly improved. Optionally, the supporting structures may be colored (e.g., blackened) to further improve the contrast ratio.

I. Preparation of the Microcups

The microcups generally may be manufactured by microembossing or photolithography as disclosed in patent applications, U.S. Ser. No. 09/518,488, filed on Mar. 3, 2000 (corresponding to WO01/67170), and U.S. Ser. No. 09/784,972, filed on Feb. 15, 2001.

I(a) Preparation of the Microcups by Embossing

Preparation of the Male Mold

The male mold may be prepared by any appropriate method, such as a diamond turn process or a photoresist process followed by either etching or electroplating after the resist is developed. The diamond turn process is preferred particularly for large microcups. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to radiation, such as ultra-violet (UV). A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous Manufacturing of Thin Cover Sheet Optical Media", *SPIE Proc.* 1663:324 (1992). The floor of the mold is typically between about 50 to 400 microns thick. The master can also be made using other microengineering techniques including e-beam writing, dry etching, chemical etching, laser writing or laser interference as described in "Replication Techniques for Micro-optics", *SPIE Proc.* 3099:76–82 (1997). Alternatively, the mold can be made by photomachining using plastics, ceramics or metals.

The male mold thus prepared typically has protrusions between about 5 to 200 microns, preferably between about 10 to 100 microns, and most preferably about 10 to 50 microns. The dimensions for the sub structures of the mold is adjusted so that after the microcups are released from the mold, the difference between the height of the sub structures and the height of the wall (i.e., the gap between the top of the structures and the top transparent viewing layer) is typically about 3 to 50 microns, preferably between about 5 to 30 microns, and most preferably between 10 to 20 microns. The male mold may be in the form of a belt, a roller or a sheet. For continuous manufacturing, the belt or the roller type of mold is preferred. Prior to applying a UV curable resin composition, the mold may be treated with a mold release to facilitate the demolding process.

Microcup Formation

Microcups with internal sub relief structures may be formed either in a batchwise process or in a continuous roll-to-roll process as disclosed in the co-pending application, U.S. Ser. No. 09/784,972, filed on Feb. 15, 2001. The latter offers a continuous, low cost and high throughput manufacturing technology for production of compartments for use in electrophoretic displays or LCDs. Prior to applying a UV curable resin composition, the mold may be treated with a mold release to facilitate the demolding process. To further improve the demolding process, the conductor film may be precoated with a primer or an adhesion promoting layer to improve the adhesion between the conductor film and the microcups.

The UV curable resin may be degassed prior to dispensing and may optionally contain a solvent. The solvent, if present, readily evaporates. The UV curable resin is dispensed by any appropriate means such as, coating, dipping, pouring and the like, over the male mold. The dispenser may be moving or stationary. For the manufacture of the display having the traditional up/down switching mode or the dual switching mode, the UV curable resin is coated onto a conductor film. Examples of suitable conductor film include transparent conductor ITO on plastic substrates such as polyethylene terephthalate, polyethylene naphthate, polyaramid, polyimide, polycycloolefin, polysulfone and polycarbonate. Pressure may be applied, if necessary, to ensure proper bonding between the resin and the plastic and to control the thickness of the floor of the microcups. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin which should have a good release property against the mold surface.

For the manufacture of displays having an in-plane switching mode, a transparent insulator substrate instead of a conductor film layer may be used in the embossing step.

Suitable transparent insulator substrates include polyethylene terephthalate, polyethylene naphthate, polyaramid, polyimide, polycycloolefin, polysulfone and polycarbonate.

The UV curable composition used for the preparation of the microcups may comprise polyvalent acrylate or methacrylate, polyvalent vinyl including vinylbenzene, vinylsilane, vinylether, polyvalent epoxide, polyvalent allyl, oligomers or polymers containing crosslinkable functional groups and the like. Multifunctional acrylate and their oligomers are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain oligomer, monomer, additives and optionally a polymer. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure. The male mold may be released from the microcups formed during or after the UV curable resin is hardened by the UV.

I(b) Preparation of the Microcups by Photolithographic Process

Alternatively, the microcups for the displays may be prepared by a photolithographic process. For example, the UV curable microcup composition is coated on an ITO film on a transparent substrate such as PET, and exposed through a photomask from the uncoated PET side. The height of the internal sub structures may be controlled by the optical density of the mask. The higher the optical density in the mask, the lower the height of the internal relief structures after the exposure and development steps.

Suitable transparent substrates include polyethylene terephthalate, polyethylene naphthate, polyaramid, polyimide, polycycloolefin, polysulfone, polycarbonate and the like.

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups and a number of small blue microcups. It is not necessary to have the same shape and number for the three colors.

The openings of the microcups may be round, square, rectangular, hexagonal or any other shape. The partition area between the openings is preferably kept small in order to achieve high color saturation and contrast while maintaining desirable mechanical properties. Consequently, the honeycomb-shaped opening is preferred over, for example, the circular opening.

The dimension of each individual microcup may be in the range of about $1\times10^2$ to about $1\times10^6$ $\mu m^2$, preferably from about $1\times10^3$ to about $1\times10^5$ $\mu m^2$. The depth of the microcups is in the range of about 5 to about 200 microns, preferably from about 10 to about 100 microns. The opening to the total area ratio is in the range of from about 0.05 to about 0.95, preferably from about 0.4 to about 0.9.

II. Preparation of the Suspension/Dispersion

The suspensions filled in the microcups comprise a dielectric solvent with charged pigment particles dispersed therein and the particles migrate under the influence of an electric field. The suspensions may optionally contain additional colorants which do not migrate in the electric field. The dispersion may be prepared according to methods well known in the art, such as U.S. Pat. Nos. 6,017,584, 5,914, 806, 5,573,711, 5,403,518, 5,380,362, 4,680,103, 4,285,801, 4,093,534, 4,071,430 and 3,668,106, and as described in *IEEE Trans. Electron Devices,* 24:827 (1977), and *J. Appl. Phys.* 49(9):4820 (1978).

The suspending fluid medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as dichlorobenzotrifluoride, 3,4, 5-trichlorobenzotrifluoride, chloropentafluoro-benzene, dichlorononane, pentachlorobenzene, and perfluorinated solvents such as perfluorodecalin, perfluorotoluene, perfluoroxylene, FC-43, FC-70 and FC-5060 from 3M Company, St. Paul Minn., low molecular weight fluorine containing polymers such as poly(perfluoropropylene oxide) from TCI America, Portland, Oreg., poly (chlorotrifluoroethylene) such as Halocarbon Oils from Halocarbon Product Corp., River Edge, N.J., perfluoropolyalkylether such as Galden, HT-200, and Fluorolink from Ausimont or Krytox Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

The contrasting colorant may be dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black (Pylam Products Co., Arizona), Thermoplastic Black X-70 (BASF), anthraquinone blue, anthraquinone yellow 114, anthraquinone reds 111 and 135, anthraquinone green 28 and Sudan Black B (Aldrich). Fluorinated dyes are particularly useful when perfluorinated solvents are used. In the case of a contrasting color pigment, the color pigment particles may also be dispersed in the dielectric medium and these colored particles are preferably uncharged. If the contrasting color pigment particles are charged, they preferably carry a charge which is opposite from that of the charged primary pigment particles. If both the primary and contrasting color pigment particles carry the same charge, then they should have different charge density or different electrophoretic mobility. The dye or pigment used in EPDs must be chemically stable and compatible with other components in the suspension.

The charged primary pigment particles are preferably white, and may be organic or inorganic pigments, such as $TiO_2$.

If colored pigment particles are used, they may be formed from phthalocyanine blue, phthalocyanine green, diarylide yellow, diarylide AAOT yellow, and quinacridone, azo, rhodamine, perylene pigment series (Sun Chemical), Hansa yellow G particles (Kanto Chemical) and Carbon Lampblack (Fisher). Particle size is preferably in the range of 0.01–5 microns, and is even more preferably in the range of 0.05–2 microns. These particles should have acceptable optical characteristics, should not be swollen or softened by the dielectric solvent and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or nonionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymers (such as Ganex, International Specialty Products), (meth) acrylic acid copolymers and N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for producing the non-migrating fluid colorant may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

III. Filling and Sealing of the Microcups

The filling and sealing procedures are described in the co-pending US applications, U.S. Ser. No. 09/518,488, filed on Mar. 3, 2000 (corresponding to WO01/67170), and U.S. Ser. No. 09/784,972, filed on Feb. 15, 2001 referred to in the previous sections, the disclosures of which are incorporated herein by reference in their entirety.

The sealing of the microcups may be accomplished in a number of ways. A preferred approach is to disperse a UV curable composition containing multifunctional acrylates, acrylated oligomers, and photoinitiators into an electrophoretic fluid containing charged pigment particles dispersed in a colored dielectric solvent. The UV curable composition is immiscible with the dielectric solvent and has a specific gravity lower than that of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as isopropanol, methanol or an aqueous solution mixture thereof may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure and seal the microcups. Alternatively, heat or moisture may also be employed to cure and seal the microcups, if appropriate heat or moisture curable compositions are used.

A preferred group of dielectric solvents exhibiting desirable density and solubility discrimination against acrylate monomers and oligomers are halogenated hydrocarbons and their derivatives. Surfactants may be used to improve the adhesion and wetting at the interface between the electrophoretic fluid and the sealing materials. Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the microcups, particularly when the sealing precursor is at least partially compatible with the dielectric solvent. Thus, the sealing of the microcups may be accomplished by overcoating a thin layer of thermoset precursor which is hardenable by radiation, heat, solvent evaporation, moisture or interfacial reactions on the surface of the filled microcups.

Volatile organic solvents may be used to adjust the viscosity and the thickness of the coatings. When a volatile solvent is used in the overcoat, it is preferred that it is immiscible with the dielectric solvent. In the co-pending patent application, U.S. Ser. No. 09/874,391, filed Jun. 4, 2001, thermoplastic elastomers have been disclosed as the preferred sealing material.

Examples of useful thermoplastic elastomers include di-block, tri-block or multi-block copolymers represented by the formulas ABA or (AB)n in which A is styrene, α-methylstyrene, ethylene, propylene or norbonene; B is butadiene, isoprene, ethylene, proplyene, butylene, dimethoylsiloxane or propylene sulfide; and A and B cannot be the same in the formula. The number, n, is $\geq 1$, preferably 1–10. Representative copolymers include poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene), and poly(α-methylstyrene-b-dimethylsiloxane-b-α-methylstyrene). Additives, such as silica particles and surfactants, may be used to improve the film integrity and coating quality.

Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. The two-step overcoating process is particularly useful when the dye used is at least partially soluble in the sealing material.

IV. Preparation of Monochrome Electrophoretic Displays

The process is illustrated by the flow diagram as shown in FIG. 2. All microcups are filled with a suspension of the same color composition. The process can be a continuous roll-to-roll process comprising the following steps:

1. Coat a layer of UV curable composition (20), optionally with a solvent, on a continuous web (21). The solvent, if present, readily evaporates. Depending on applications and the display switching mode, the continuous web (21) may be a plastic substrate, a patterned or non-patterned conductor film on a plastic substrate.
2. Emboss the UV curable composition (20) at a temperature higher than its glass transition temperature by a pre-patterned male mold (22).
3. Release the mold from the UV curable layer (20) preferably during or after it is hardened by the UV exposure.
4. Fill in the thus-formed array of microcups (23) with discrete sub relief structures (25) with a charged pigment dispersion (24) in a colored dielectric solvent.
5. Seal the microcups by the methods described in co-pending patent applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01281), U.S. Ser. No. 09/784,972, filed on Feb. 15, 2001 and U.S. Ser. No. 09/874,391, filed Jun. 4, 2001, thus forming closed electrophoretic cells containing the electrophoretic fluid.

The sealing methods include adding to the dielectric solvent at least a thermoset precursor which is incompatible with the solvent and has a lower specific gravity than the solvent and the pigment particles, i.e., the electrophoretic fluid, followed by curing the thermoset precursor optionally by radiation such as UV or by heat or moisture during or after the thermoset precursor separates. Alternatively, the sealing of the microcups may be accomplished by directly overcoating and hardening the sealing composition over the surface of the electrophoretic fluid.

6. Laminate the sealed array of electrophoretic cells with another continuous web (26) comprising electrodes or conductor lines pre-coated with an adhesive layer (27) which may be a pressure sensitive adhesive, a hot melt adhesive or a heat, moisture or radiation curable adhesive.

The laminate adhesive may be post cured by, for example, heat or UV (28) through either side of the web. The finished product may be cut (29) after the lamination step. Alternatively, the sealed microcups may be cut to appropriate size before the lamination step.

The preparation of the microcups described above can be conveniently replaced by the alternative procedure of imagewise exposing the conductor film coated with a thermoset precursor followed by removing the unexposed areas by an appropriate solvent.

For the manufacture of displays having the in-plane switching mode, the thermoplastic or thermoset precursor may be coated on a transparent insulator substrate instead of a conductor film, before microembossing or imagewise exposure.

V. Preparation of Multi-Color Electrophoretic Displays

The methods described in co-pending patent applications, U.S. Ser. No. 09/518,488 (corresponding to WO01/67170), filed on Mar. 3, 2000 and U.S. Ser. No. 09/879,408, filed on Jun. 11, 2001 may be used to prepare sealed microcups containing electrophoretic fluids of different colors. The process includes (1) laminating the already formed microcups with a positively working dry-film photoresist consisting of at least a removable support such as PET-4851 from Saint-Gobain, Worcester, Mass., a novolac positive photoresist such as Microposit S1818 from Shipley, and an alkali-developable adhesive layer such as a mixture of Nacor 72-8685 from National Starch and Carboset 515 from BF Goodrich; (2) selectively opening a certain amount of the microcups by imagewise exposing the photoresist, removing the removable support film, and developing the positive photoresist with a developer such as diluted Microposit 351 developer from Shipley; (3) filling the opened microcups with the electrophoretic fluid containing charged white pigment ($TiO_2$) particles and dye or pigment of the first primary color; and (4) sealing the filled microcups as described in the preparation of monochrome displays. These additional steps may be repeated to create microcups filled with the electrophoretic fluids of the second and the third primary colors.

More specifically, a multi-color electrophoretic displays may be prepared according to the steps as shown in FIG. 3:

1. Coat a layer of thermoplastic or thermoset precursor (30) on a conductor film (31).
2. Emboss the thermoplastic or thermoset precursor layer at a temperature higher than its glass transition temperature by a pre-patterned male mold (not shown).
3. Release the mold from the thermoplastic or thermoset precursor layer preferably during or after it is hardened by cooling or crosslinking by radiation, heat or moisture.
4. Laminate the thus formed array of microcups (32) with discrete sub relief structures (32a) with a positive dry-film photoresist which comprises at least an adhesive layer (33), a positive photoresist (34) and a removable plastic cover sheet (not shown).
5. Imagewise expose (FIG. 3c) the positive photoresist by UV, visible light, or other radiation, remove the cover sheet, develop and open microcups in the exposed area. The purpose of Steps 4 and 5 is to selectively open the microcups in a predetermined area (FIG. 3d).
6. Fill in the opened microcups with a charged white pigment dispersion (35) in a dielectric solvent containing at least a dye or pigment of the first primary color and a thermoset precursor (36) which is incompatible with the solvent and has a lower specific gravity than the solvent and the pigment particles.
7. Seal the microcups to form closed electrophoretic cells containing electrophoretic fluid of the first primary color by curing the thermoset precursor (preferably by radiation such as UV, less preferably by heat or moisture) during or after the thermoset precursor separates and forms a supernatant layer on top of the liquid phase (FIG. 3e).
8. Steps 5–7 described above may be repeated to generate well-defined cells containing electrophoretic fluids of different colors in different areas (FIGS. 3e, 3f and 3g).
9. Laminate the sealed array of electrophoretic cells in registration to a second, pre-patterned transparent conductor film (37) pre-coated with an adhesive layer (38) which may be a pressure sensitive adhesive, a hot melt adhesive or a heat, moisture or radiation curable adhesive.
10. Harden the adhesive.

In the Step 4 above, lamination of a dry film positively working photoresist onto the microcups may be replaced by directly coating the positive photoresist onto the microcups. Removable fillers may be used to fill the microcups before the photoresist is coated or laminated onto the microcups. In this case, no cover sheet is needed. This is disclosed in co-pending application U.S. Ser. No. 09/879,408, filed on Jun. 11, 2001.

Suitable materials for use as a filler include inorganic, organic, organometallic, polymeric materials or their particulates. The filler should be soluble or dispersible in the cleaning solution. More preferable filler materials are non-film forming particles such as latexes of PMMA, polystyrene, polyethylene and their carboxylated copolymers and their corresponding salts, wax emulsions, colloidal silica, titanium oxide, calcium carbonate dispersions or mixtures thereof. Particularly preferable filler materials include aqueous dispersions of ionomers of ethylene copolymers such as ACqua220, ACqua240 or ACqua250 (Honeywell, N.J.).

The multi-color displays having the in-plane switching mode may be similarly prepared except that the layer of thermoplastic or thermoset precursor in Step 1 may be coated on a transparent insulator substrate instead of the conductor film.

The preparation of the microcups described in the process above can conveniently be replaced by the alternative procedure of imagewise exposing the conductor film coated with a thermoset precursor followed by removing the unexposed areas by an appropriate solvent.

The sealing of the microcups may be alternatively accomplished by directly coating a layer of the thermoset precursor material over the surface of the liquid phase.

Alternatively, color EPDs of this invention may be achieved by using color filters on the top of the displays as disclosed in a co-pending patent application U.S. Serial No. 60/308,437, filed on Jul. 27, 2001 or using color background at the bottom of the displays as disclosed in another co-pending patent application U.S. Serial No. 60/306,312, filed on Jul. 17, 2001.

The thickness of the display produced by the present processes as described can be as thin as a piece of paper. The width of the display is the width of the coating web (typically 1–90 inches). The length of the display can be anywhere from inches to thousands of feet depending on the size of the roll.

The optional background layer may be added by painting, printing, coating or laminating a color layer to the bottom of the displays. To increase the contrast ratio, a black or gray background layer is most preferred.

An active matrix EPD may also be prepared by using thin film transistors (TFT) on the bottom electrode plate of the display.

V. Displays of the Present Invention

VI. Displays of the Present Invention

VI(a) Display with Up/Down Switching Mode

When there is a voltage difference between the top and bottom electrode plates, the charged particles migrate to the top or bottom of the cells. When the particles migrate to and remain at the top of the cells, the color of the particles is seen through the top transparent layer. When the particles migrate to and remain at the bottom of the cells, the color of the dielectric solvent is seen through the top transparent layer.

VI(b) Display with In-plane Switching Mode

Figure 4A:
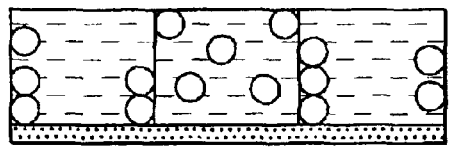
FIGS. 4A–4F illustrate the display having an in-plane switching mode.

For a monochrome display, in the cell as shown in FIG. 4A, white particles are dispersed in a clear, colorless dielectric solvent. The background of all cells is of the same color (black, blue, cyan, red, magenta, etc.). When there is a voltage difference between the top (not shown) and the two in-plane switching electrodes (not shown), the white particles migrate to the sides of the cells, resulting in the color of the background being seen through the top transparent opening. When there is no voltage difference between the top and the two in-plane electrodes, the white particles are distributed in the dielectric solvent and as a result, the color of the particles (i.e., white) is seen through the top transparent insulator layer.

Figure 4B:
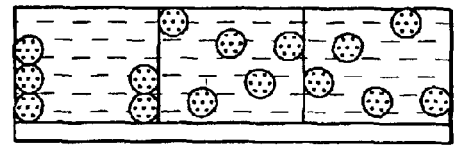

Alternatively, as shown in FIG. 4B, particles of the same color are dispersed in a clear, colorless dielectric solvent in all cells and the background of the cells is white. When there is a voltage difference between the top (not shown) and the two in-plane switching electrodes (not shown), the colored particles migrate to the sides of the cells, resulting in the color of the background (i.e., white) being seen through the top transparent opening. When there is no voltage difference between the two in-plane electrodes and the top electrode, the colored particles are distributed in the dielectric solvent and as a result, the color of the particles is seen through the top transparent layer.

FIGS. 4C–4F illustrate the multiple color display having the in-plane switching mode.

Figure 4C:
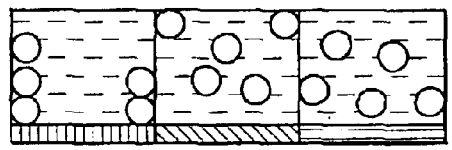

In FIG. 4C, the cells are filled with a colorless dielectric solvent with white charged particles dispersed therein, and have different background colors (i.e., red, green or blue). When there is a voltage difference between the in-plane electrodes and the top electrode (not shown), the white particles migrate to the sides of the cell, the color of the background (i.e., red, green or blue) is seen from the top transparent opening. When there is no voltage difference between the in-plane electrodes and the top electrode, the particles are distributed in the dielectric solvent resulting in the white color (i.e., the color of the particles) being seen from the top transparent opening.

Figure 4D:
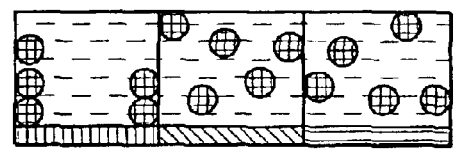

In FIG. 4D, the cells are filled with a colorless dielectric solvent with black particles dispersed therein, and have different background colors (i.e., red, green or blue). When there is a voltage difference between the in-plane electrodes and the top electrode (not shown), the particles migrate to the sides of the cell, the color of the background (i.e., red, green or blue) is seen from the top transparent opening. When there is no voltage difference between the in-plane electrodes and the top electrode, the particles are distributed in the dielectric solvent, resulting in the black color (i.e., the color of the particles) being seen from the top transparent opening.

Figure 4E:
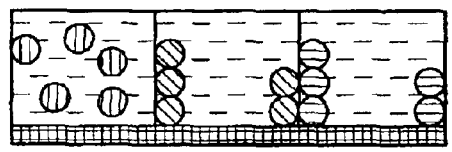

FIG. 4E shows the cells filled with a colorless dielectric solvent with particles of different colors (i.e., red, green or blue) dispersed therein. The background of the cells is black. When there is a voltage difference between the in-plane electrodes and the top electrode (not shown), the colored charged to particles migrate to the sides of the cell, the color of the background (i.e., black) is seen from the top transparent opening. When there is no voltage difference between the in-plane electrodes and the top electrode, the colored particles are distributed in the dielectric solvent, resulting in the color of the particles (i.e., red, green or blue) being seen from the top transparent opening. In this design, the black state is of high quality.

Figure 4F:
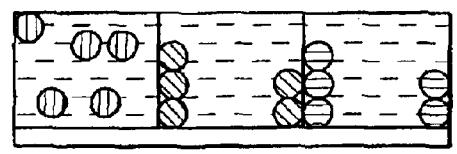

In FIG. 4F, the cells are filled with a colorless dielectric solvent with particles of different colors (red, green or blue) dispersed therein. The background of the cells is white. When there is a voltage difference between the in-plane electrodes (not shown) and the top electrode, the particles migrate to the sides of the cell, the color of the background (i.e., white) is seen from the top transparent opening, resulting in a high quality white state. When there is no voltage difference between the in-plane electrodes and the top electrode, the particles are distributed in the dielectric solvent, resulting in the color of the particles (i.e., red, green or blue) being seen from the top transparent opening.

As shown in these figures, the in-plane switching mode allows the particles to move in the planar (left/right) direction, and different color combinations of particles, background, and fluid, wherein each is individually white, black, red, green or blue, can be used to generate various multi-color EPDs.

In addition, the particles in the dielectric solvent may be of mixed colors and the cells have the same background color.

The top transparent viewing layer of the display may be colored or colored by adding a color filter. In this case, the cells are filled with an electrophoretic composition comprising white charged particles in a clear colorless or colored dielectric solvent and the background of the cells may be black. In a monochrome display, the transparent viewing layer on each pixel is of the same color (such as black, red, green, blue, yellow, cyan, magenta, etc.). In a multiple color display, the transparent viewing layers may be of different colors.

VI(c) Display with Dual Switching Mode

Figure 5A:
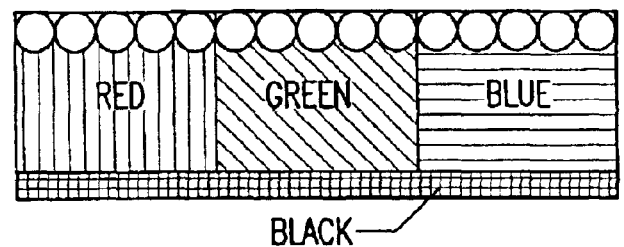
FIGS. 5A–5C illustrate the display having a dual switching mode.
Figure 5B:
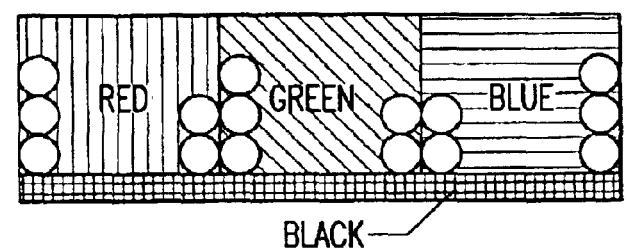
Figure 5C:
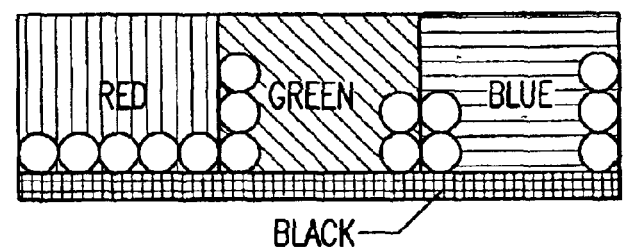

For the purpose of illustration, it is assumed that the white particles with positive charge are applied throughout this application. As shown in FIGS. 5A–5C, the dual switching mode allows the particles to move in either the vertical (up/down) direction or the planar (left/right) direction. For example, in FIG. 5A, the voltage of the bottom electrode is set high, and the voltages of the top electrode and the in-plane electrodes are set low. The white particles migrate to and gather at the top transparent conductor film, and the white color (i.e., the color of the particles) is seen by the viewer.

In FIG. 5B, the in-plane electrodes are set at low voltages, and the top and the bottom electrodes are set at high voltages. In this scenario, the white particles migrate to the sides of the cells, the color seen through the top transparent conductor film therefore is the color of the background (i.e., black).

In FIG. 5C, when the voltage of the top electrode is set high, the voltage of the bottom electrode is set low, and the in-plane electrodes are set at a high voltage, the white particles migrate to the bottom of the cells. In this scenario, the color of the fluid (i.e., red, green or blue) is seen by the viewer through the top transparent conductor film as shown in the red cell of FIG. 5C. To present a red pixel in a full color display, the white particles in the green and blue cells may be either attracted to the sides as shown in FIG. 5C or to the top (not shown). The former is preferred because it typically exhibits a better color saturation than the latter. Thus, the dual switching mode technology gives the first full-color EPD wherein all colors including red, green, blue, black and white of high quality are available in the same device.

Furthermore, the background color may be of any color (e.g., cyan, yellow or magenta) instead of the commonly used black color. For example, the cells may be filled with a red clear dielectric solvent with white positively charged particles dispersed therein and the background color of the cells may be yellow. In this case, when the particles migrate to the top, the white color (i.e., the color of the particles) is seen by the viewer and when the particles migrate to cover the bottom of the cells, the color of the medium (i.e., red) is seen through the transparent conductor. However, when the white particles migrate to the sides of the cells, the color seen through the top transparent conductor film, will be a shade of orange.

Other shades or color tones may be achieved by using different particle/medium/background color combinations, for example, white/red/cyan, white/red/magenta, white/blue/yellow, white/blue/cyan, white/blue/magenta, white/green/yellow, white/green/cyan, white/blue/magenta, etc.

The preferred combination to achieve a full color display is white particles, black background and fluids separately colored with the additive primary colors (i.e., red, green or blue).

It is noted that the sub relief structures are an essential feature of the invention. However, in order to better illustrate the movement of particles, the sub relief structures are not shown in FIGS. 4A–4F and 5A–5C. A further aspect of the invention is a monochrome display with highlight options. In such a case, all cells in the display have the same background color and are filled with the same electrophoretic fluid (i.e., having the same particle/solvent color combination). For example, the display may have white particles, the solvent is one of the primary colors (red, green or blue) and the background color is a color contrasting the solvent color. This arrangement is useful for a relatively simple two color device with a colored highlight option. For example, an EPD having white particles, a yellow dielectric solvent, and a black background can display at least three different colors in each pixel. When the white particles are all attracted to the top viewing row electrode, the pixel is seen white. When the white particles are uniformly attracted to the bottom column electrodes, the pixel is seen yellow. When the white particles are attracted to the in-plane electrode on either side of the cell, the pixel is seen black. Intermediate colors are also possible if the particles are driven to intermediate states.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising
   (a) a top transparent layer comprising an electrode plate;
   (b) a plurality of cells, said cells (i) are filled with an electrophoretic fluid comprising pigment particles which carry the same charge and are of the same color dispersed in a dielectric solvent or solvent mixture, (ii) have a background and (iii) some or all of said cells have internal sub relief structures; and
   (c) a bottom layer comprising an electrode plate; and said electrophoretic display has a dual switching mode.

2. The electrophoretic display of claim 1 wherein said sub relief structures are discrete structures.

3. The electrophoretic display of claim 2 wherein said discrete structures are columns, cylinders, wedges or crosses.

4. The electrophoretic display of claim 3 wherein said sub relief structures have a diameter or width in the range of about 3 to about 50 microns.

5. The electrophoretic display of claim 4 wherein said sub relief structures have a diameter or width in the range of about 5 to about 30 microns.

6. The electrophoretic display of claim 5 wherein said sub relief structures have a diameter or width in the range of about 8 to about 20 microns.

7. The electrophoretic display of claim 1 wherein said sub relief structures are continuous structures.

8. The electrophoretic display of claim 7 wherein said continuous structures are walls or grids.

9. The electrophoretic display of claim 1 wherein there are gaps between the top of said sub relief structures and the top transparent layer.

10. The electrophoretic display of claim 9 wherein said gap is about 3 to about 50 microns.

11. The electrophoretic display of claim 10 wherein said gap is about 5 to about 30 microns.

12. The electrophoretic display of claim 11 wherein said gap is about 10 to about 20 microns.

13. The electrophoretic display of claim 1 wherein said sub relief structures have a round, square, rectangular or oval cross-section.

14. The electrophoretic display of claim 1 wherein said display has an average of at least one sub relief structure per cell.

15. The electrophoretic display of claim 1 wherein some of said cells do not have said internal sub relief structures.

16. The electrophoretic display of claim 1 wherein the top surface of said sub relief structures may be of any shape and is not larger than the bottom surface of said sub relief structures.

17. The electrophoretic display of claim 1 wherein the shortest distance between the sub relief structures and any of the cell walls is less than three times of the cell height.

18. The electrophoretic display of claim 17 wherein the shortest distance between the sub relief structures and any of the cell walls is less than two times of the cell height.

19. The electrophoretic display of claim 1 wherein the cells comprises cells of different sizes and shapes.

20. The electrophoretic display of claim 1 wherein the cells are non-spherical.

21. The electrophoretic display of claim 1 wherein the cells are formed from microcups with an opening area ranging from about $1 \times 10^2$ to about $1 \times 10^6$ $\mu m^2$.

22. The electrophoretic display of claim 1 wherein the cells are formed from microcups with an opening area ranging from about $1 \times 10^3$ to about $1 \times 10^5$ $\mu m^2$.

23. The electrophoretic display of claim 1 wherein the cells are formed from microcups with an opening having a circular, polygonal, hexagonal, rectangular or square shape.

24. The electrophoretic display of claim 1 wherein the cells have a depth in the range from about 5 to about 200 microns.

25. The electrophoretic display of claim 1 wherein the cells have a depth in the range from about 10 to about 100 microns.

26. The electrophoretic display of claim 1 wherein the cells have an opening to total area ratio in the range from about 0.05 to about 0.95.

27. The electrophoretic display of claim 1 wherein the cells have an opening to total area ratio in the range from about 0.4 to about 0.9.

28. The electrophoretic display of claim 1 wherein said sub relief structures are colored.

29. The electrophoretic display of claim 1 wherein said charged pigment particles are white.

30. The electrophoretic display of claim 29 wherein said dielectric solvent is of a color selected from the group consisting of red, green and blue.

31. The electrophoretic display of claim 29 wherein said background is black.

32. The electrophoretic display of claim 29 wherein all of said charged pigment particles are positively charged.

33. The electrophoretic display of claim 1 which has a tri-color system based on the color of the charged pigment particles, color of the dielectric solvent and color of the background.

34. The electrophoretic display of claim 1 wherein all of said cells are sealed.

35. The electrophoretic display of claim 34 wherein all of said cells are sealed with a sealing layer formed from a sealing composition having a specific gravity lower than that of the electrophoretic fluid.

36. The electrophoretic display of claim 35 wherein said sealing composition is a radiation curable composition.

37. The electrophoretic display of claim 35, wherein said sealing composition is a heat or moisture curable composition.

38. The electrophoretic display of claim 35 wherein said sealing composition comprises a thermoplastic elastomer.

39. The electrophoretic display of claim 38 wherein said thermoplastic elastomer is a di-block, tri-block or multi-block copolymer represented by the formulas ABA or (AB)n in which A is styrene, α-methylstyrene, ethylene, propylene or norbonene, B is butadiene, isoprene, ethylene, proplyene, butylene, dimethoylsiloxane or propylene sulfide and n is $\geq 1$.

40. The electrophoretic display of claim 38 wherein said thermoplastic elastomer is selected from the group consisting of poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene) and poly(α-methylstyrene-b-dimethylsiloxane-b-α-methylstyrene).

* * * * *